(12) United States Patent
Joseph

(10) Patent No.: US 6,698,173 B2
(45) Date of Patent: Mar. 2, 2004

(54) MOWER HAVING ADJUSTABLY LOCKABLE HANDLEBAR AND ENGINE CONTROL

(75) Inventor: Franz Joseph, Engelskirchen (DE)

(73) Assignee: SABO Maschinenfabrik GmbH, Gummersbach (DE)

(*) Notice: Subject to any disclaimer, the term of this patent is extended or adjusted under 35 U.S.C. 154(b) by 0 days.

(21) Appl. No.: 09/945,421

(22) Filed: Aug. 31, 2001

(65) Prior Publication Data
US 2002/0084117 A1 Jul. 4, 2002

(30) Foreign Application Priority Data

Sep. 2, 2000 (DE) .......................... 100 43 241
Sep. 2, 2000 (DE) .......................... 100 43 243
Sep. 2, 2000 (DE) .......................... 100 43 240

(51) Int. Cl.[7] .......................... A01D 69/10; A01D 34/63
(52) U.S. Cl. .......................... 56/16.7; 56/11.3
(58) Field of Search .......................... 56/10.2 R, 10.3, 56/10.8, 11.3, 16.7, DIG. 18; 172/351, 361, 364

(56) References Cited

U.S. PATENT DOCUMENTS

| 3,729,908 A | | 5/1973 | Miner |
| 3,764,156 A | * | 10/1973 | Nepper et al. .......... 56/DIG. 18 |
| 3,791,116 A | | 2/1974 | Wykhuis |
| 4,041,679 A | * | 8/1977 | Seifert et al. ................ 56/11.3 |
| 4,230,200 A | | 10/1980 | Carolan ....................... 180/272 |
| 4,266,319 A | | 5/1981 | Mason |
| 4,599,912 A | * | 7/1986 | Barnard et al. ............... 56/11.3 |
| 4,738,084 A | * | 4/1988 | Ogano et al. .......... 56/DIG. 18 |
| 4,753,062 A | | 6/1988 | Roelle |
| 4,930,300 A | | 6/1990 | Benter et al. ................. 56/16.7 |
| 4,958,804 A | | 9/1990 | Lenius et al. ................ 254/120 |
| 5,307,612 A | * | 5/1994 | Tomiyama et al. .......... 56/11.1 |
| 5,355,661 A | * | 10/1994 | Tomiyama ................... 56/10.8 |
| 5,915,487 A | | 6/1999 | Splittstoesser et al. ...... 180/19.1 |
| 6,018,937 A | | 2/2000 | Shimada et al. ............. 56/10.5 |
| 6,101,678 A | * | 8/2000 | Malloy et al. ................. 16/430 |

FOREIGN PATENT DOCUMENTS

| CH | 0480 774 | 11/1969 |
| DE | 26 48 349 A1 | 2/1978 |
| DE | 90 05 367.2 | 8/1990 |
| DE | 4428373 C1 | * 2/1996 |
| DE | 198 39 203 C2 | 3/2000 |
| EP | 0 903 074 A1 | 3/1999 |
| FR | 2 237 566 | 2/1975 |
| FR | 2 780 375 | 12/1999 |
| GB | 816145 | 7/1959 |
| GB | 1 497 081 | 1/1978 |
| GB | 2 328 359 | 2/1999 |

OTHER PUBLICATIONS

Patent Abstracts of Japan vol. 1996, No. 11, Nov. 29, 1996 & JP 08 172843 A (Ryobi Ltd) Jul. 9, 1996.
Patent Abstracts of Japan vol. 1996, No. 12, Dec. 26, 1996 & JP 08 205651 (Iseki & Amp Co Ltd) Aug. 13, 1996.

* cited by examiner

Primary Examiner—Robert E. Pezzuto
Assistant Examiner—Nathan Mammen

(57) ABSTRACT

A mower having a locking mechanism for locking a moveable handlebar of the mower in its operating position is provided. The mower further includes an actuator for controlling operation of the mower so as to permit or not permit operation of an implement powered thereby when the handlebar is in its operating position. Additionally, the locking mechanism may be used to assist in the fastening of an attachment such as a debris collection receptacle. Also, since the handlebar may be moved into a non-operating position, the handlebar may be used as a prop so as to, for example, permit necessary maintenance on the underside of the mower to be more easily accomplished.

33 Claims, 12 Drawing Sheets

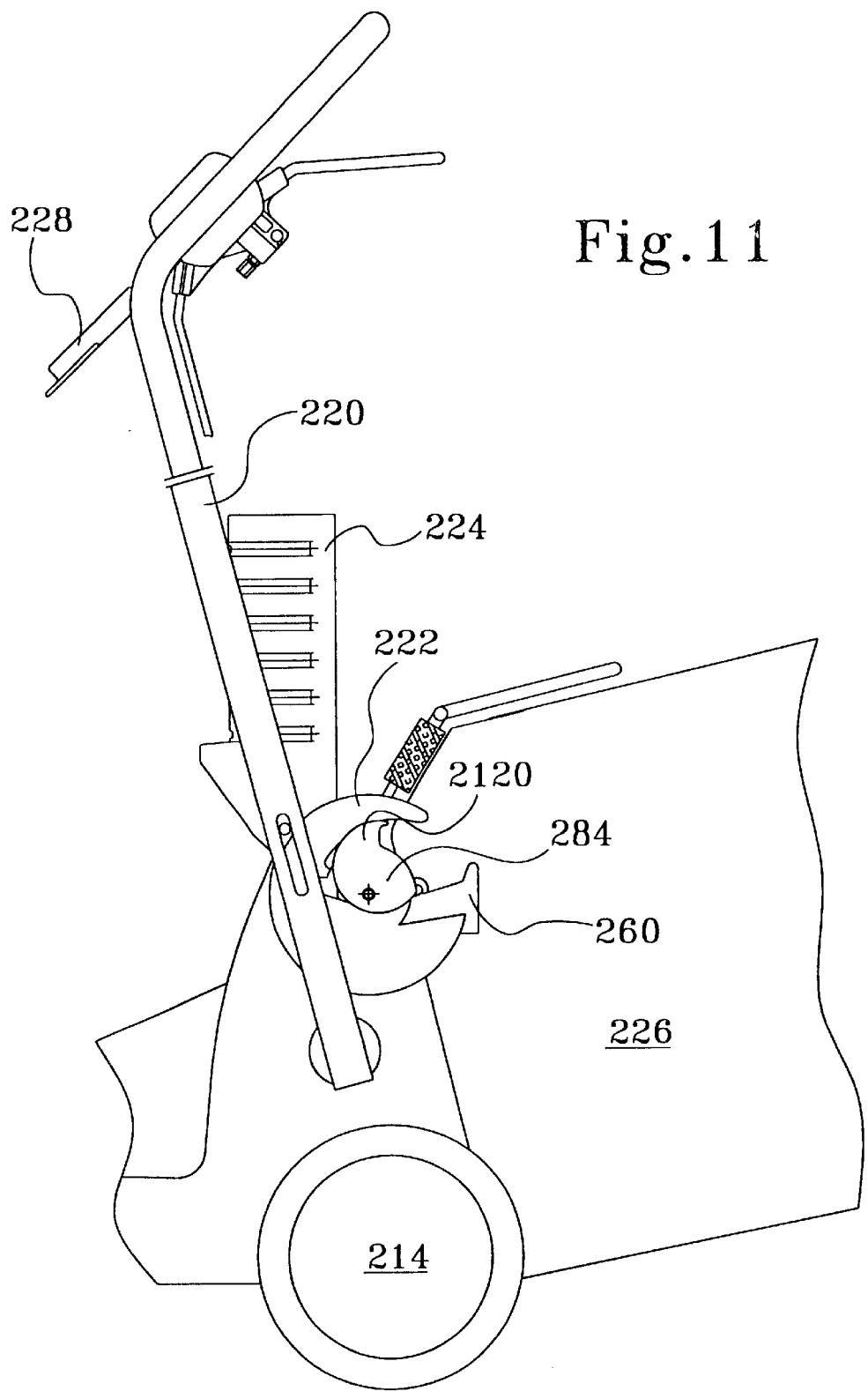

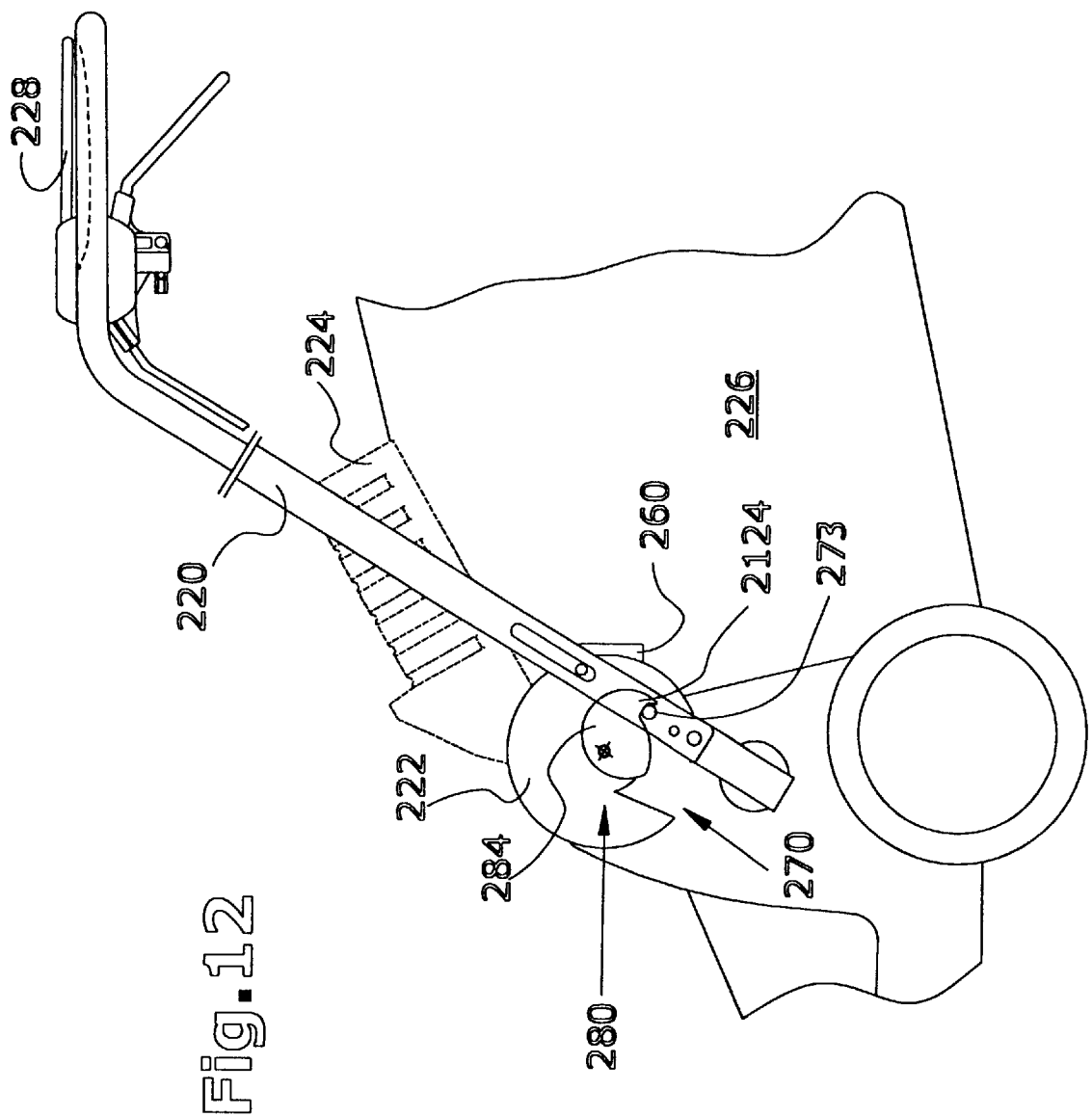

MOWER HAVING ADJUSTABLY LOCKABLE HANDLEBAR AND ENGINE CONTROL

FIELD OF THE INVENTION

This invention relates to walk-behind mowers, and more specifically, to structure which cooperates to both lock the position of the mower handlebar and control operation of the mower itself.

BACKGROUND OF THE INVENTION

Walk-behind or hand-guided mowers often have a handlebar provided at the rear of the mower onto which an operator can grasp and thereby control it during its operation. Often, these handlebars are moveable forwardly of their operating position so that they may consume less space when the mowers are either stored or transported.

Additionally, past designs of the above type of mowers have also included mechanisms that shield the discharge chutes thereof so as to prevent vegetation that is cut from being ejected from the mowers. In particular, these mechanisms have caused an access flap covering the discharge chute thereof to remain in place when a collection receptacle is not connected thereto. This access flap is usually lifted upwardly upon an attachment, such as a collection bag, being secured to the mower housing.

In providing these mechanisms in conjunction with adjustable handlebars, separate parts or components have had to have been used to accomplish the separate functions of locking of the handlebars in a desired position as well as securing the access flaps to the mowers. Thus, it would be beneficial to provide a single apparatus that serves to lock the handlebar in a desired position, control operation of the mower and/or secure and allow for the easy removal of a debris collection receptacle such as a bag or other means to the mower housing.

SUMMARY OF THE INVENTION

Accordingly, there is provided an invention that permits locking of the handlebar in a desired position while also enabling an ability to permit or disable operation of the mower upon a change in the handlebar's position. Additionally, given an ability to lock the handlebar in either an operational or non-operational position, two further capabilities including an ability to easily secure and/or remove an attachment to the mower housing as well as an ability to use the handlebar as a prop on which the mower may be supported against the ground surface so as to permit easy access to its underside are permitted.

To permit locking of the handlebar, a locking lever is provided which mounts with the handlebar through a pin and slot arrangement. As a result, pivoting of the handlebar will cause pivoting of the locking lever. Securing or locking the handlebar in place once the locking lever has been pivoted with it is accomplished through actuation of a compressible trigger or handle at the end of the handlebar arrangement.

The actuator or trigger mentioned above is designed to work in conjunction with the locking lever and an engine brake to selectively cause engagement of the mower engine and its implement(s). The mechanism is constructed to communicate with the locking lever and the engine brake through a spring-assisted pull cable that connects with each of them. Accordingly, upon actuation of the mechanism's trigger, the pull cable is stimulated to act or not act on the locking lever and the engine brake to effect the securing of the handlebar as well as the ability of the mower engine to operate, respectively.

Additionally, as a result of the shape or design of the locking lever, preferably provided in a substantially disk-shape configuration having hook portions, a holding or attachment mechanism of a collecting receptacle or other accessory may conveniently mate with the lever and thus the mower. In order to ensure that the accessory stays attached with the mower, a propping element in the form of a plate have alternating teeth and grooves with which the attachment mechanism may interface is provided at the rear of the mower and in proximity to the lever. Therefore, an operator may, with the assistance of gravity, be assured that the accessory will stay in place relative to the mower since the attachment will hang onto and then be retained within the grooves of the propping element.

Further, as a result of being able to move and/or lock the handlebar, the mower may be tilted to the rear and stood up relative to the ground whereby the handlebar serves as a prop. With this positioning, an operator has the opportunity to inspect the underside of the mower housing and then carry out any maintenance that may be deemed necessary. This ability is advantageous in the sense that the mower may be positioned so as to avoid spillage of fuel or other engine oils onto various engine components which could lead to the flooding of the engine and consequent difficulty in starting it.

BRIEF DESCRIPTION OF THE DRAWINGS

FIG. 11 is a side view of the mower corresponding to FIG. 10 with the handlebar pivoted forwards to its non-operating position.

FIG. 12 is a side view according to FIG. 11, whereby the handlebar is in its operating position.

DESCRIPTION OF THE PREFERRED EMBODIMENTS

Figure 1:
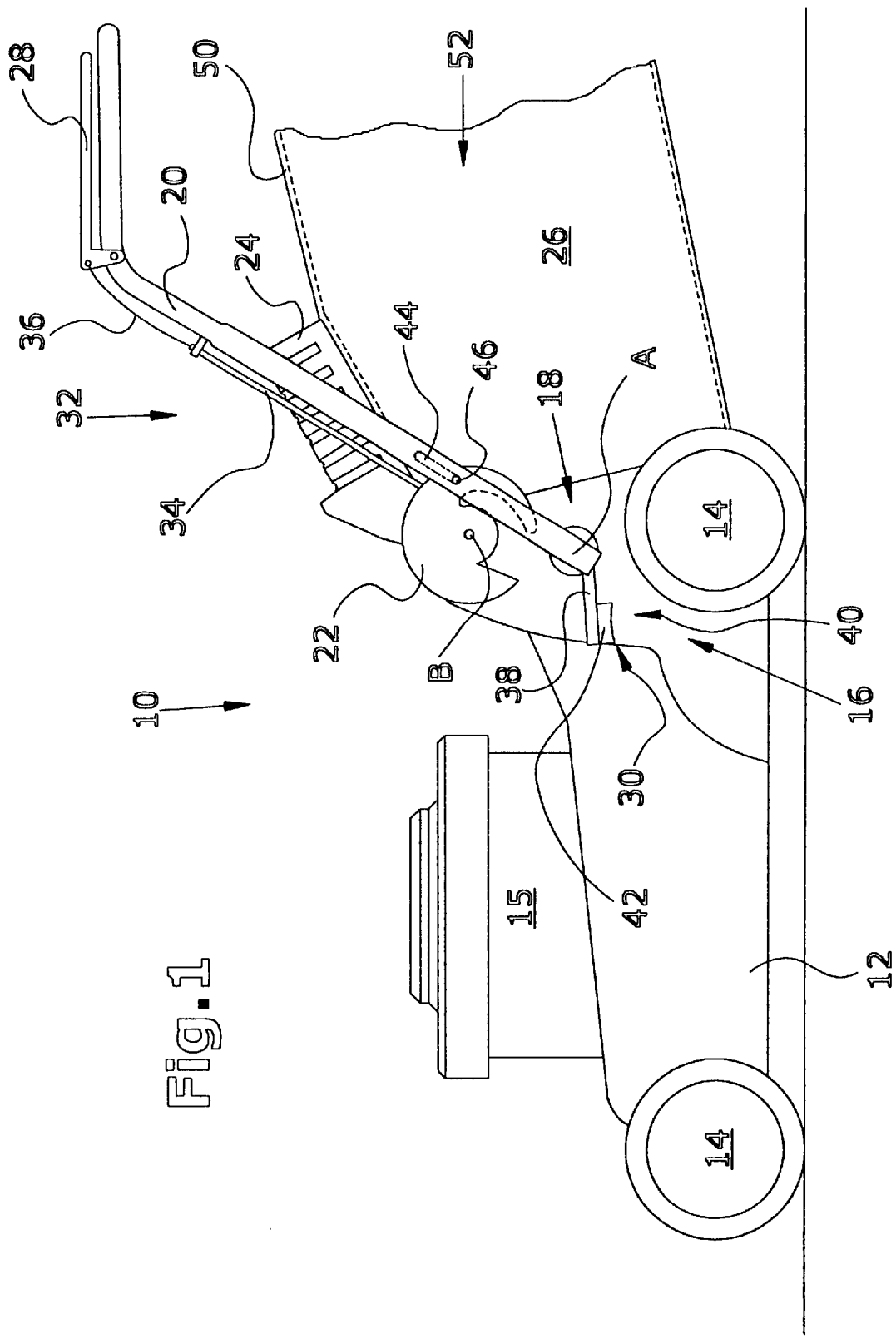
FIG. 1 is a side view of a mower of the present invention with its handlebar in the operating position.

Looking to FIG. 1, there is shown a mowing machine or mower 10 in the form of a hand-guided or hand-pushed lawnmower in its operating position. The machine 10 has a housing unit 12 that is supported by two front and two rear wheels 14. On the housing unit 12, there is an engine 15, in the form of a combustion or electrical engine in order to rotate one or more mowing blades or working parts, for example sickle blades or rotary blades below the housing unit 12 to cut grass and other vegetation.

The housing unit 12 has, at its rear 16, a discharge opening 18 through which plant cuttings and other vegetation can exit the housing unit 12.

As shown in FIG. 1, in the rear 16 of the housing unit 12, a handlebar 20 is pivotally mounted about an axis A, a locking lever 22 is pivotally mounted about an axis B, which is at least at some distance above axis A, whereby each of which is in addition to a cover flap 24 that is mounted about an axis which is not depicted but which is preferably located on a swivel mount further back. In the present figure, only the left-hand locking lever relative to the usual operating position of the machine 10 is shown. Preferably, locking levers 22 will be arranged on both sides of the machine 10, and be located opposite each other. Adjacent the rear 16, as shown in FIG. 1, a collecting receptacle 26 is affixed detachably to the machine 10 or its housing unit 12 so that vegetation emitted from the discharge opening 18 can be collected.

The handlebar 20 is designed as a linkage of bars and has an opening or a slot 44 therein which is oriented towards the housing unit 12 or the axis A and into which a pin 46 located on the locking lever 22 can interlock to permit simultaneous movement of the handlebar 20 and the locking lever 22 together. As the handlebar is pivoted forwardly, the locking lever 22 will rotate counterclockwise and, conversely, as the handlebar 20 is pivoted rearwardly, the locking lever 22 will rotate clockwise relative to the housing unit 12. Preferably, the locking lever is disc-shaped.

In addition, an actuator 28 designed as an engine brake trigger or release is provided at the end of the handlebar 20 in an area turned away from the housing unit 12, as shown in FIG. 1, whereby the trigger 28 is connected to a braking mechanism 30 via a pull cable 32. The pull cable 32 has a cover 34 and a core 36 in the form of a wire located within the cover 34 and can be pulled through the covering 34 upon actuation of the brake mechanism 30. The pull cable 32 is connected to the handlebar 20 by its cover 34 and works in conjunction with the actuator 28 through its core 36. On the other end, the pull cable 32 works in conjunction with the locking lever 22 and other components that will be discussed in greater detail below. The braking mechanism 30 is designed as a lever 38 connected to the handlebar 20 and runs radially along axis A and can be pivoted in conjunction with the handlebar 20. On its end opposite axis A, the braking mechanism 30 is equipped with a brake lining 42, which can operate on the wheels 14, as is shown in FIGS. 1–3.

Figure 2:
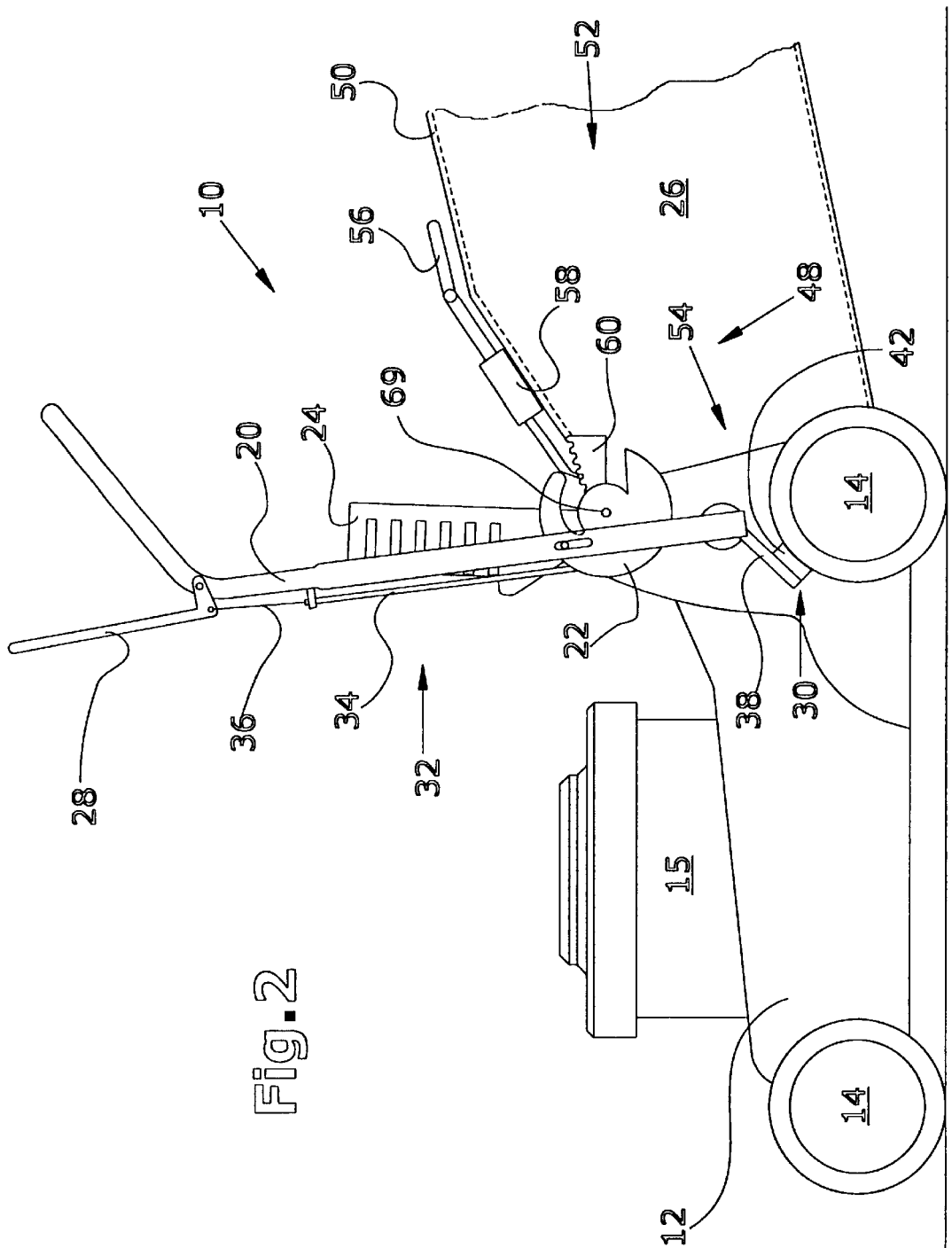
FIG. 2 is a corresponding side view of the handlebar when it is swung forward relative to the rest of the mower.

Looking to FIG. 2, the mower 10 is shown in a non-operating position in which the handlebar 20 is swung forward relative to the housing unit 12, as is the locking lever 22 connected to the handlebar 20 by the slot 44 and the pin 46. As depicted in FIG. 2, the cover flap 24 is also brought into a pivoted, up-turned position as a result of pivoting the handlebar 20 forwardly. To maintain this position, a pin, which is not depicted, is located on the handlebar 20 in the area of cover flap 24, which can interlock with a slot, which is also not depicted, or even a slit on the cover flap 24 in such a way that the cover flap 24 moves together with the handlebar 20. The slot or slit is arranged to be able to compensate for the different pivotal radii of the components located on different axes.

With an up-turned cover flap 24, the collecting receptacle 26 is visible, along with an attachment mechanism 48 by which the collecting receptacle 26 can be connected to the housing unit 12.

Figure 3:
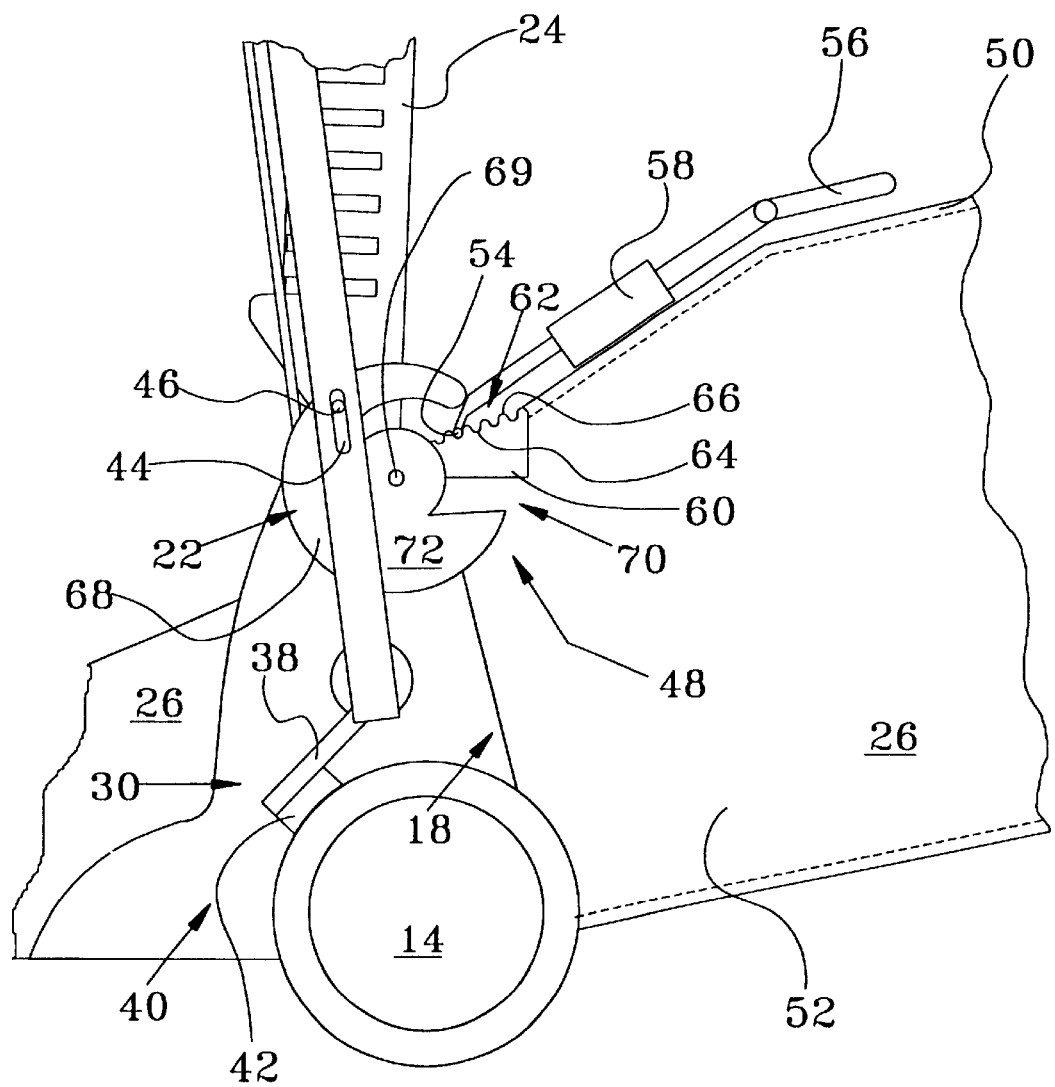
FIG. 3 is an enlarged view of the connection between the handlebar and a housing unit of the mower, as well as a securing mechanism permitting a collecting receptacle to be attached to the housing unit.

Reference is now made to FIG. 3 which shows the rear 16 of the housing unit 12 with the attachments adjacent to or being located thereon and is depicted in the non-operating position shown in FIG. 2.

The collecting receptacle 26 contains a frame 50 which is preferably formed of metal or plastic rods. This frame 50 is covered with an outer casing 52, which can for example be made out of textile or even a foil-type material. In one spot, which points toward the discharge opening 18 in a location attached to the housing unit 12, the collecting receptacle 26 has a transfer opening (not shown) so that vegetation can enter the collecting receptacle 26 after it has been cut. Above the transfer opening, a catch 56 is located on the collecting receptacle 26, which is connected to the outer casing 52 by loops 58 so that the collecting receptacle can be moved or lifted by adjusting the catch 56. The catch 56, at an end proximate to the discharge opening, has a holding mechanism 54 including an arrangement of laterally outwardly extending pins 57 on both sides of an end thereof.

The attachment mechanism 48 has 2 propping elements 60 (only shown from the left-hand side). Such a propping element 60 is connected to the housing unit 12 on one end and projects beyond it on the other end. One surface 62 of the propping element 60 is formed in such a way that it slopes away from the housing unit 12, forming a ramp, and has several grooves 64 or projections 66 in the form of alternating teeth into which the pins interface.

Figure 4:
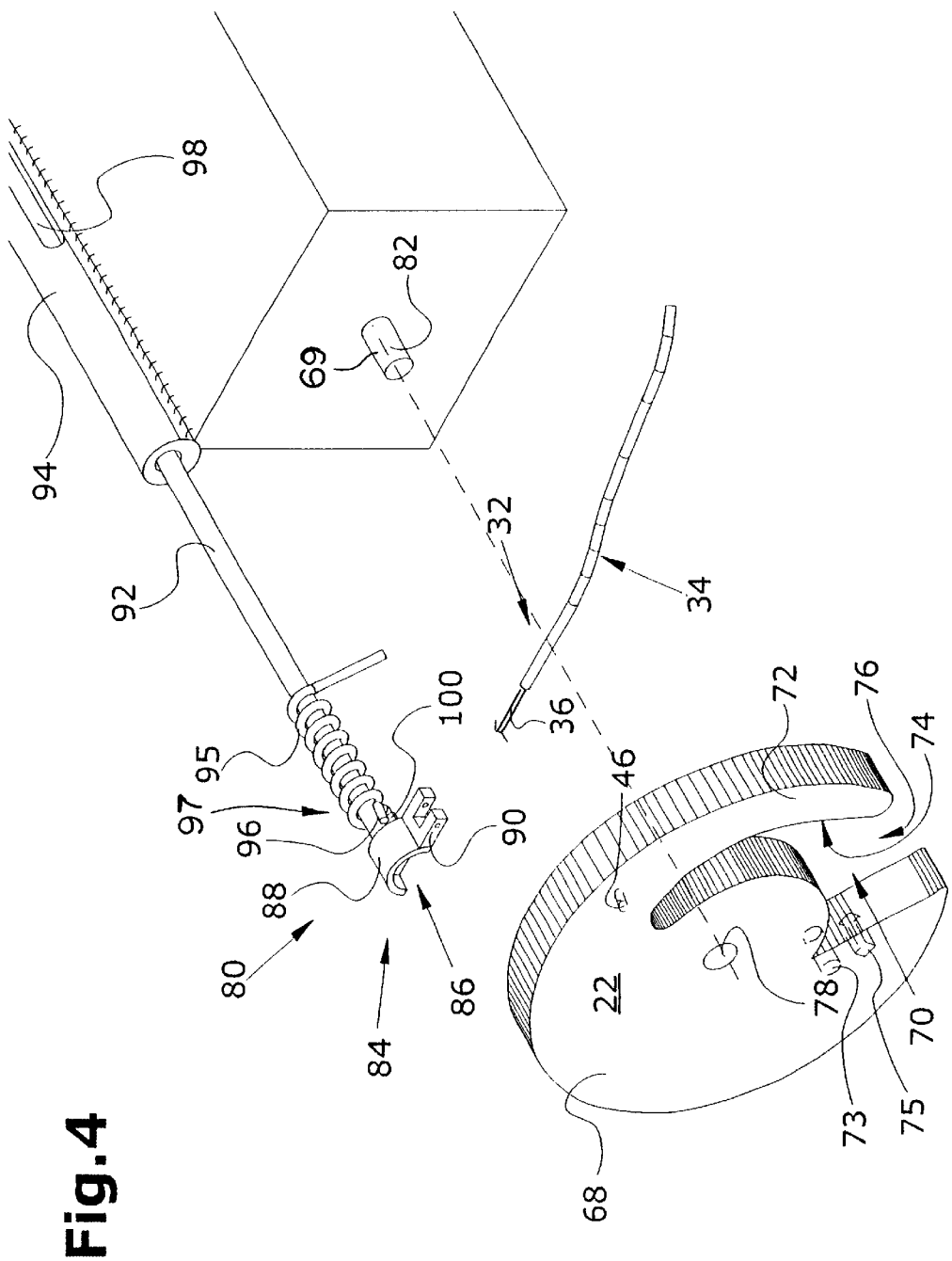
FIG. 4 is an enlarged view of a locking mechanism and an actuator used to assist in locking the handlebar into position.

In FIG. 4, the arrangement of the left-hand locking lever 22 on the housing unit 12, as well as a locking mechanism 80, is shown therein. The locking lever 22 is shown removed from its housing 12 and is disc-shaped to prevent it from clamping when swinging with the handlebar, since the disc surface can move along the handlebar or the housing unit while being pivoted. The locking lever 22 is constructed as a disc 68 with an approximately circular cross-section, which has a cut out area 70 which faces the collecting receptacle 26 and is adjoined by a hook-shaped section 72 of the disc 68. Relative to the middle of the disc 68, the hook-shaped section 72 is adjoined inside by a curved surface 74, which in conjunction with the remainder of the disc 68 meets a tapering section 76. In addition, the disc 68 has a central opening 78 whereby it rotates about a pin 69 that mounts the disc 68 to the housing 12 as shown in FIG. 4. On the locking lever 22 on an area opposite the hook-shaped section 72 of the disc 68, a stopping element 73 extending from the disc 68 as well as a second stopping element 75 located adjacent thereto are provided.

The locking lever 22 is connected to the housing unit 12 via an axis 82 of pin 69, which substantially corresponds to pivotal axis A. When assembled, the opening 78 is positioned to coincide with the axis 82 so that the locking lever 22 can pivot around the axis 82 and is secured to the handlebar 20 by conventional means in the form of a conventional nut and pin arrangement.

As shown in FIG. 4, the locking mechanism 80 has a stopping mechanism 84 that features a somewhat semicircular main piece 86 with an outwardly projecting edge 88 allowing it to be formed in the shape of a collar. On the main piece 86, there is located a radially spaced lever element 90 that is firmly connected with the main piece 86 on one end and is formed on the other end so as to allow connection with the cover 34, thereby permitting the casing 34 to be rotatable with it while disallowing longitudinal motion of the casing 34 with respect to the connection. The stopping mechanism 84 is connected firmly with an axle 92, which is received by a support tube 94 firmly connected with the housing unit 12, for example by welding, so that both the axle 92 and the stopping mechanism 84 are connected pivotally to the housing unit 12. A torsion spring 95 that has two ends is mounted on the axle 92. One of the ends 96 of the spring 95 is received by an opening 98 in the support tube 94, and the other end 97 rests on an end of the stopping mechanism 84 that is only shown implicitly in such a way that the axle 92 and thus the stopping mechanism 84 are weighed down toward the rear of the machine 10 or clockwise as shown in FIG. 4.

Figure 5:
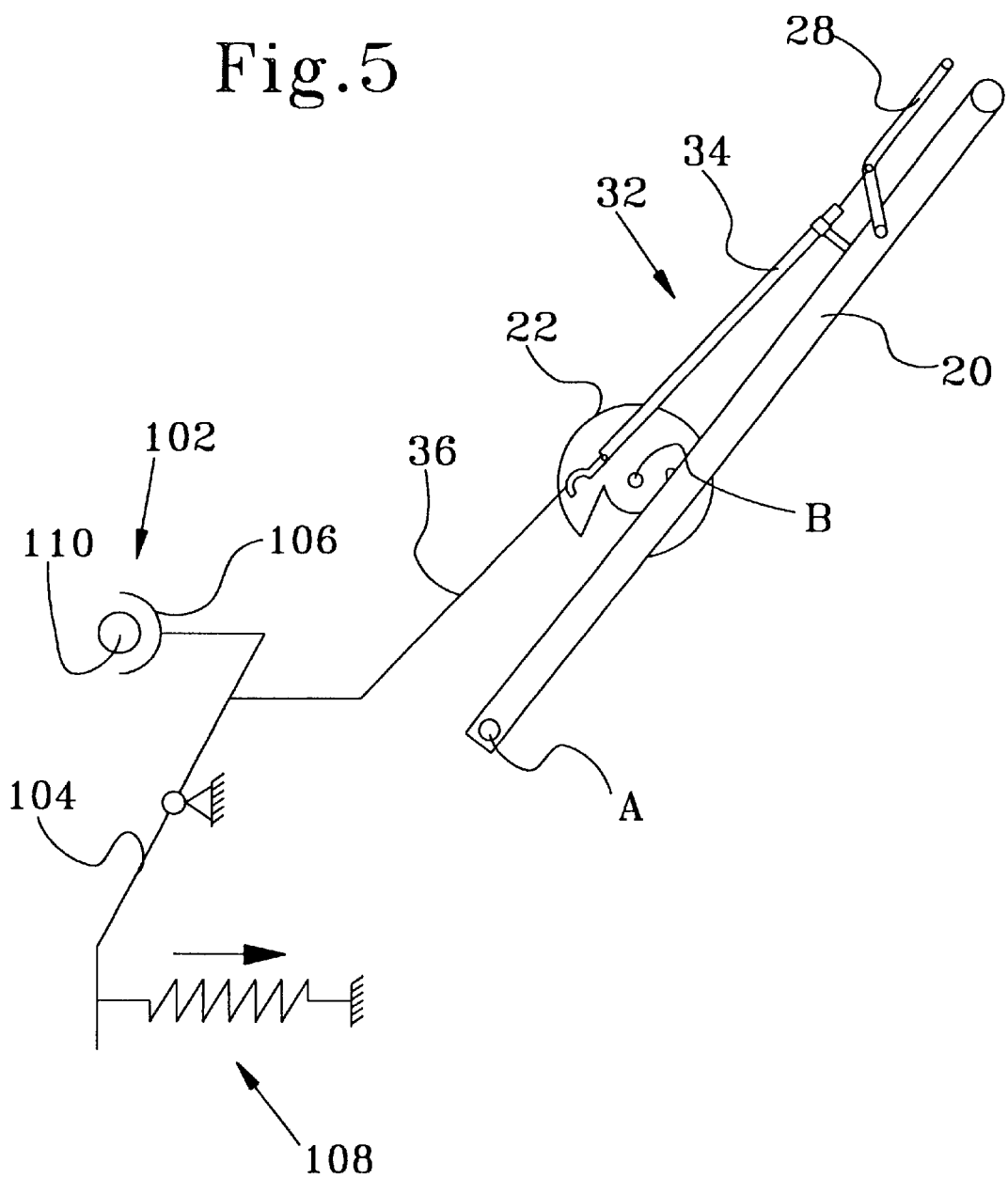
FIG. 5 is a schematic diagram of the functional relationship between the handlebar, the locking lever, the actuator and an engine brake of the mower.

Reference is now made to FIG. 5 to clarify the functional relationship of the handlebar 20 and the securing mechanism 28 with the locking lever 22 and the stopping mechanism 84, as well the relationship of the above-mentioned components with an engine brake 102 of the machine 10. The engine brake 102 is located on the housing unit 12 of the machine 10 in proximity to the engine 15 and is only schematically depicted in FIG. 5. The engine brake 102 has a movable, mounted brake lever 104, which on one end determines the position of a braking mechanism 106, which for example can be designed in the form of one or more brake shoes or brushes, and is loaded by a spring 108 on the other end. The braking mechanism 106 operates on the engine 15 or preferably on a rotor or flywheel 110 of the engine 15. The spring 108, in turn, operates on the brake lever 104 in a manner that allows the braking mechanism 106 to be loaded in the direction adjacent to the flywheel 110, in which the engine 15 cannot be operated or a rotation of the mower blades or movement of the wheels 14 is interrupted. As depicted in FIG. 5, the core 36 of the pull cable 32 is also connected with the brake lever 104. The point of connection is selected so that movement of the core 36 counteracts the force of the spring 108, causing the braking mechanism 106 to be lifted from the flywheel by the core 36 and operation of the engine 15 or rotation of the mower blades or movement of the wheels 14 is then made possible. The relation and function of the collecting receptacle 25 relative to its position on the housing 12 and pivoting of the handlebar 20 is now discussed below.

Figure 6:
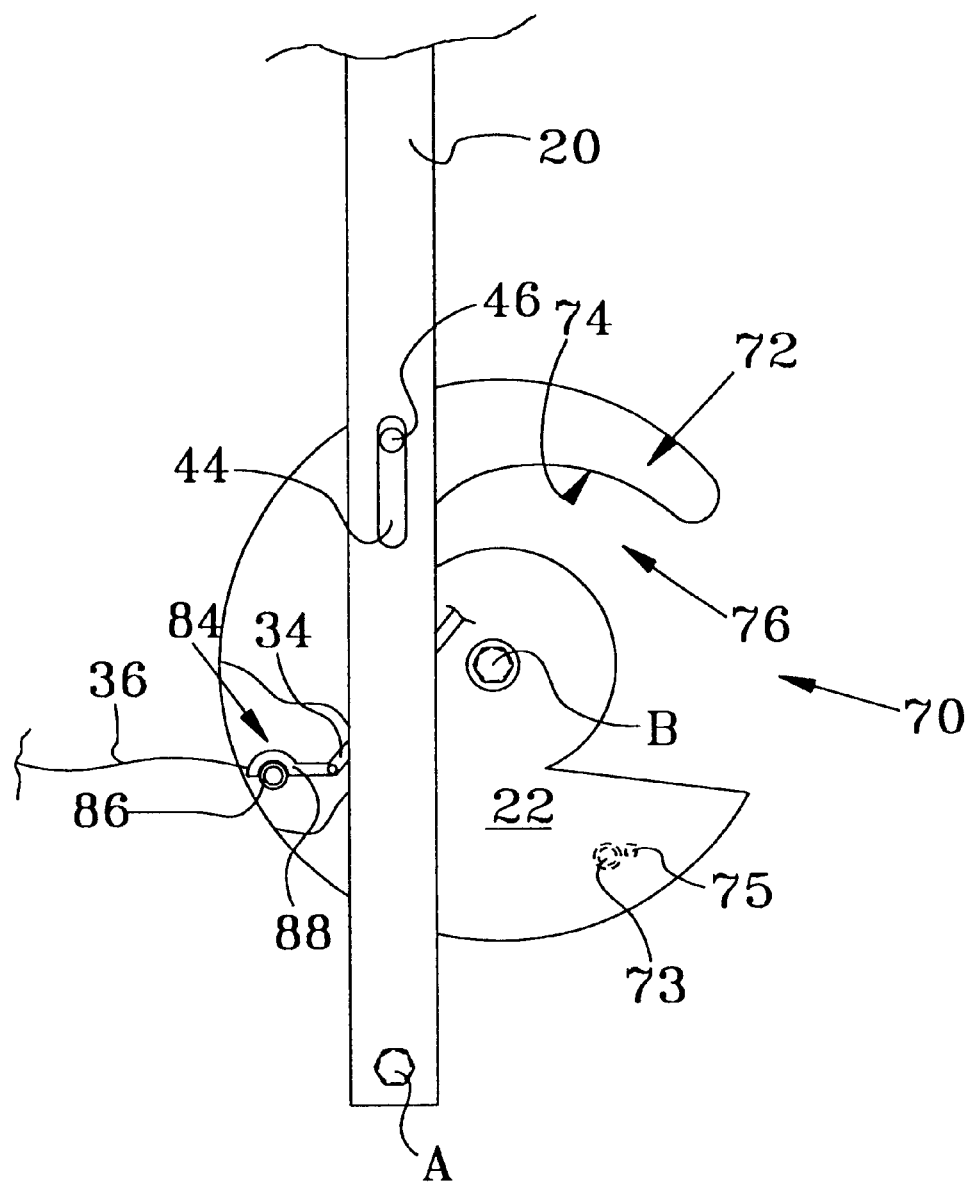
FIG. 6 is a side perspective of the handlebar pivoted forwards relative to the mower, whereby the locking mechanism and a stopping mechanism thereof is in a position in which it does not secure the handlebar.
Figure 7:
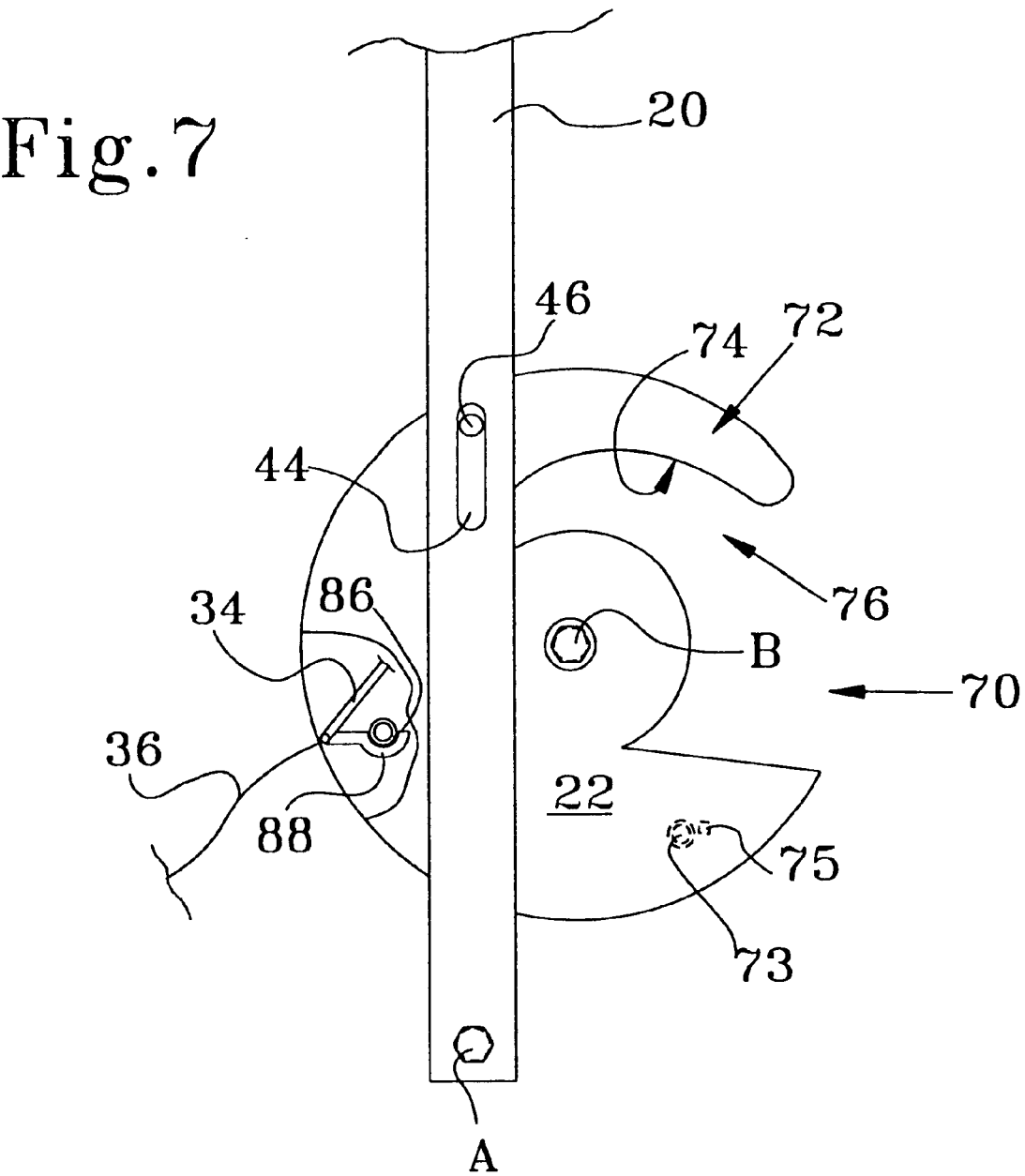
FIG. 7 is a side perspective according to FIG. 6, whereby the stopping mechanism is in a pivoted position relative to the handlebar so as to lock the handlebar in a forward position.

In FIGS. 2, 6 and 7, the locking lever 22 is shown in the position that it assumes when the handlebar 20 is swung forward relative to the machine 10. In this position, the hook-shaped section 72 of the locking lever 22 is shown and the discharge opening 18 in the housing unit 12 is not covered by the cover flap 24, since as described above, both the cover flap 24 and the locking lever 22 move together with the handlebar 20. In order to connect the collecting receptacle 26 to the machine 10, an operator motions the handlebar 22 forward and raises the collecting receptacle 26 by means of the handles or grips 56 in order to bring it up to a point above the discharge opening 18. The holding mechanism 54 tends to slope downward, loaded by the weight of the collecting receptacle 26 into the grooves 64 of the propping elements 60 thereby resulting in a first securing of the collecting receptacle 26. Also, the ramp-shaped formation of the propping elements 60 prevents undesired slipping of the collecting receptacle 26, since the propping elements 60 slope down toward the discharge opening 18. The installed collecting receptacle 26; due to its own weight, tends to swing towards the machine 10 with its end located vertically opposite the holding mechanism 54, thereby further preventing its slipping. When the handlebar is in this position, the braking mechanism 30 operates on the wheels of the machine in such a way that these cannot turn to any great extent and the machine 10 is prevented from rolling away in this non-operating position.

Figure 8:
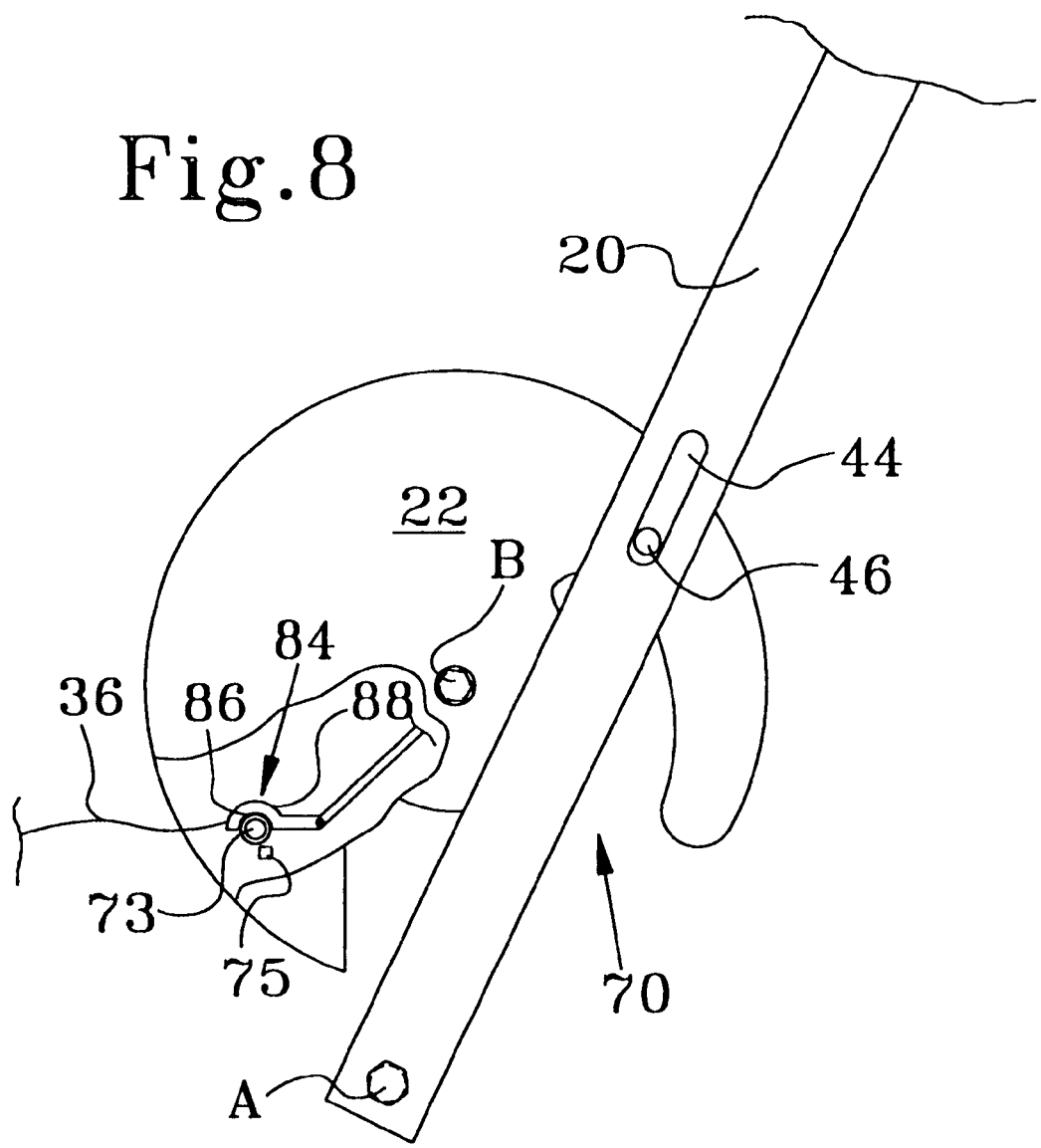
FIG. 8 is a side perspective of the handlebar pivoted rearwardly with respect to the remainder of the mower whereby the locking mechanism and its stopping mechanism is in a position in which it does not secure the handlebar.
Figure 9:
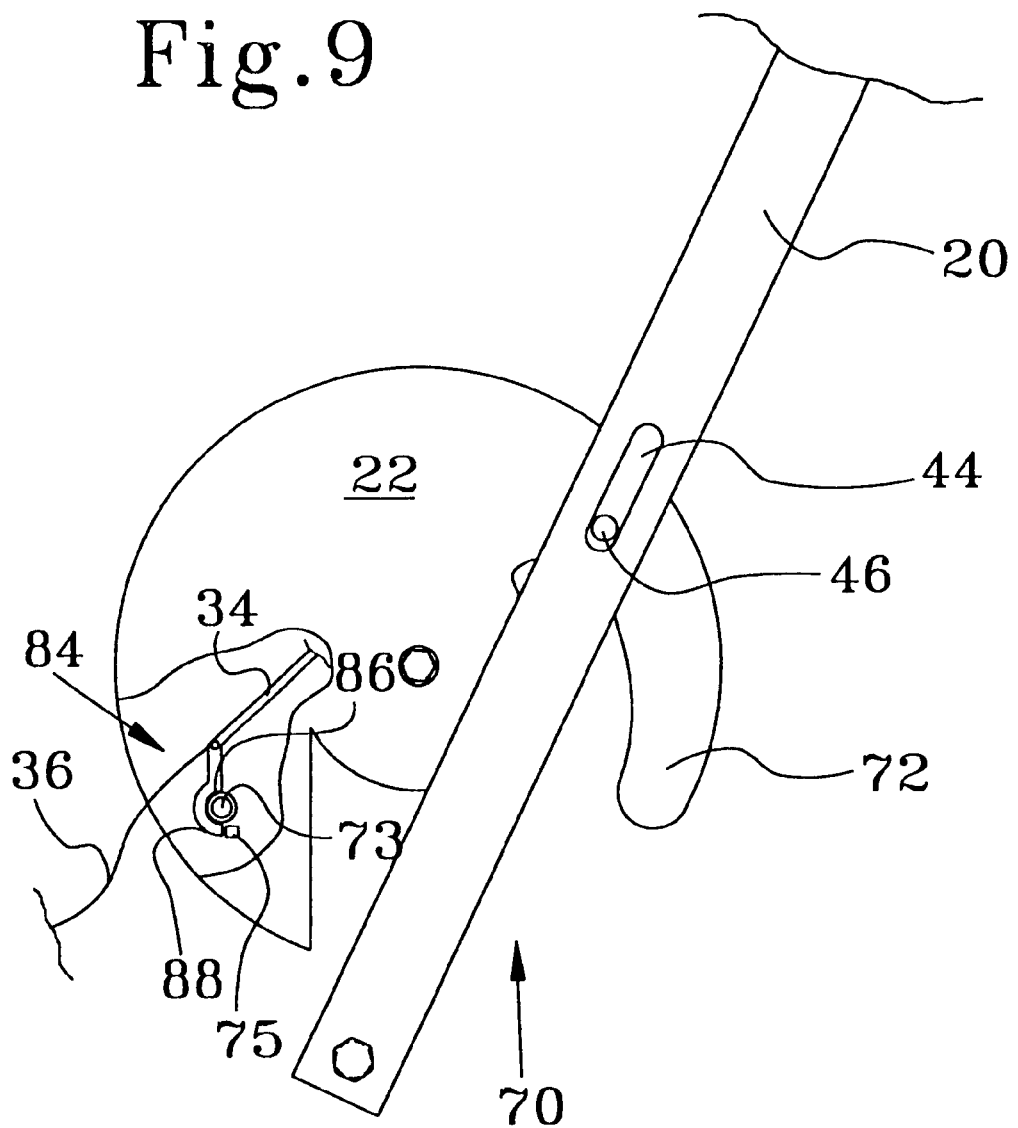
FIG. 9 is a side perspective of the locking lever and the handlebar with the stopping mechanism in position to lock the handlebar in its operating position.

In order to further secure the collecting receptacle 26 to the machine 10, the handlebar is brought to the position shown in FIG. 1, whereby FIGS. 8 and 9 illustrate the corresponding position of the locking lever 22. During a movement of the handlebar 20 to the back, the locking lever 22 also moves backwards so that the hook-shaped section 72 interlocks with the holding mechanism 54 or its pins and the latter enters into the section 76, as shown in FIG. 4. Interlocking of the locking lever 22 and the attachment mechanism 48 or the holding mechanism 54 is promoted the handlebar 20 and the locking lever 22 having different pivotal axes A, B, respectively. Also, by the tapering form of the section 76, the holding mechanism 54 is pulled in along the contour of the section 76 or of the hook-shaped sections 72 during the pivoting of the locking lever 22, whereby this is assisted even further by the ramp-shaped design of the propping elements 60. Also, the cover flap 24 turns to the rear of the housing unit 12 and will rest, if it is spring-loaded in this direction, on the collecting receptacle 26. If the handlebar 20 is swung rearwardly, without a collecting receptacle 26 being placed on the intake mechanism 48, the cover flap turns to the rear until it rests on the housing unit 12 and thereby closes the discharge opening 18 in order to prevent unintentional access to the mower blades and discharge of cut vegetation. In addition, by spring-loading, it is kept permanently in this position.

In the following description, the locking mechanism 80 will now be considered, which functions to secure the handlebar 20 after it is swung rearwardly to its operating position against unintentional movement therefrom and also to allow operation of the machine 10 only when the handlebar 20 is secured in this rearwardly swung operating position.

As is illustrated in FIGS. 5 to 9 and as described above, the locking mechanism 80 works via the pull cable 32 in conjunction with the actuator 28 and the engine brake 102. In the diagram in FIG. 6, the handlebar 20 is swung forward and the actuator 28 is not activated. That is, it is not pulled towards the handlebar 20, but rather is also in a forward or lifted position relative to the handlebar 20. Thus, no force is exerted on the locking mechanism 80 by the pull cable 32, thereby allowing the stopping mechanism 84 to be situated in a backwards position due to loading by the torsion spring 95. Also, the pull cable 32 does not operate to lift the brake lever 104, thereby causing the engine brake 102 to remain applied against the flywheel 110 so as to render the mower 10, its wheels 14 and any implement(s) thereof inoperable. From this position, the locking lever 22 can be pivoted in conjunction with the handlebar 20. Further, the stopping elements 73 and 75 are, in this position, turned away from the locking mechanism 80 and do not work in conjunction with it.

If the operator wants to activate or operate the engine 15 in this forward-swung position of the handlebar 20, or an unintentional activation of the actuator 28 occurs, this has no effect on the engine brake 102 and the engine 15 remains inoperative. Corresponding to FIG. 7, pivoting of the actuator 28 backwards or down towards the handlebar 20 results in pivoting the stopping mechanism 84 forwards. By squeezing the actuator 28, the loosely arranged core 36 of the pull cable 32 is pulled backwards. The outer casing 34 is connected firmly to a rear part of the handlebar 20 at its other end and is attached to the stopping element 84 on the other end. Thus, the casing 34 can pivot or move together with the element 84 against the force of the torsion spring 95 as the handlebar 20 is moved. This results since the force of the spring 108 loading the engine brake 102 surpasses the force of the torsion spring 95; and movement of the core 36 results in movement of the outer casing 34 to the front of the machine 10 as the element 84 is moved. Movement of the outer casing 34 is induced by the fact that the length of the core 36 within the outer casing 34 remains constant although compression of the actuator 28 will force the core 36 rearwardly and upwardly against the casing 34 so as to draw up slack existing between the end connections of the core 36. Thus, although the slack may be drawn tighter, the distance between the connection of the core 36 to the trigger 28 as well as the difference in the strength of springs 95 and 108 is insufficient to permit a squeezing of the trigger 28 to overcome the spring 108 acting on the engine. Accordingly, the engine is rendered inoperative when the handlebar is placed in its non-operating position. Also, pivoting the handlebar 20 from this position is possible, although it is unable to be completely pivoted into its operating position. Securing of the handlebar 20 in this position also cannot occur since the stopping mechanism 84 will strike the outside edge 88 of the first stopping element 73 upon activation of the actuator 28.

In FIG. 8, the handlebar 20 is shown in its operating position swung completely rearwardly. The stopping mechanism 84 is situated in the position that it assumes when the actuator 28 is not activated or is not pulled backwards towards the handlebar 20. The first stopping element 73 is received by the projecting edge 88 of the main part 86, thereby restricting the pivotal motion of the handlebar 20.

Reference is now made to FIG. 9, which shows the position of the stopping mechanism 84 when the actuator 28 as seen in FIG. 8 is activated. Squeezing or pivoting the actuator 28 to the rear or towards the handlebar 20 causes a rearward motioning of the core 36. This movement causes, as described above, a pivoting of the stopping element 84 together with the outer casing 34. This movement is, however, restricted by the second stopping element 75 when the locking lever 22 assumes the position indicated in FIGS. 8 and 9, whereat the edge 88 or the base of the stopping mechanism 84 makes contact therewith. Additionally, the core 36 is pulled further back by the actuator 28, so that the brake lever 104 is moved against the force of the spring 108. As a result, the engine brake 102 is deactivated or the braking mechanism 106 is lifted from the flywheel 110 so that the engine can be operated and the mower blades or the wheels 14 can be powered. The first stopping element 73 is received by the edge 88 and is slid into the collar portion of stopping mechanism 84 such that movement of the locking lever 22 is prevented with an activated actuator 28. In this way, the handlebar 20 is firmly fixed in its operating position by the activated actuator 28, whereby an unintentional swinging of the handlebar to the front of the mower 10 is prevented and a specific or necessary distance between the user and the operating mower 10 is permitted.

Figure 10:
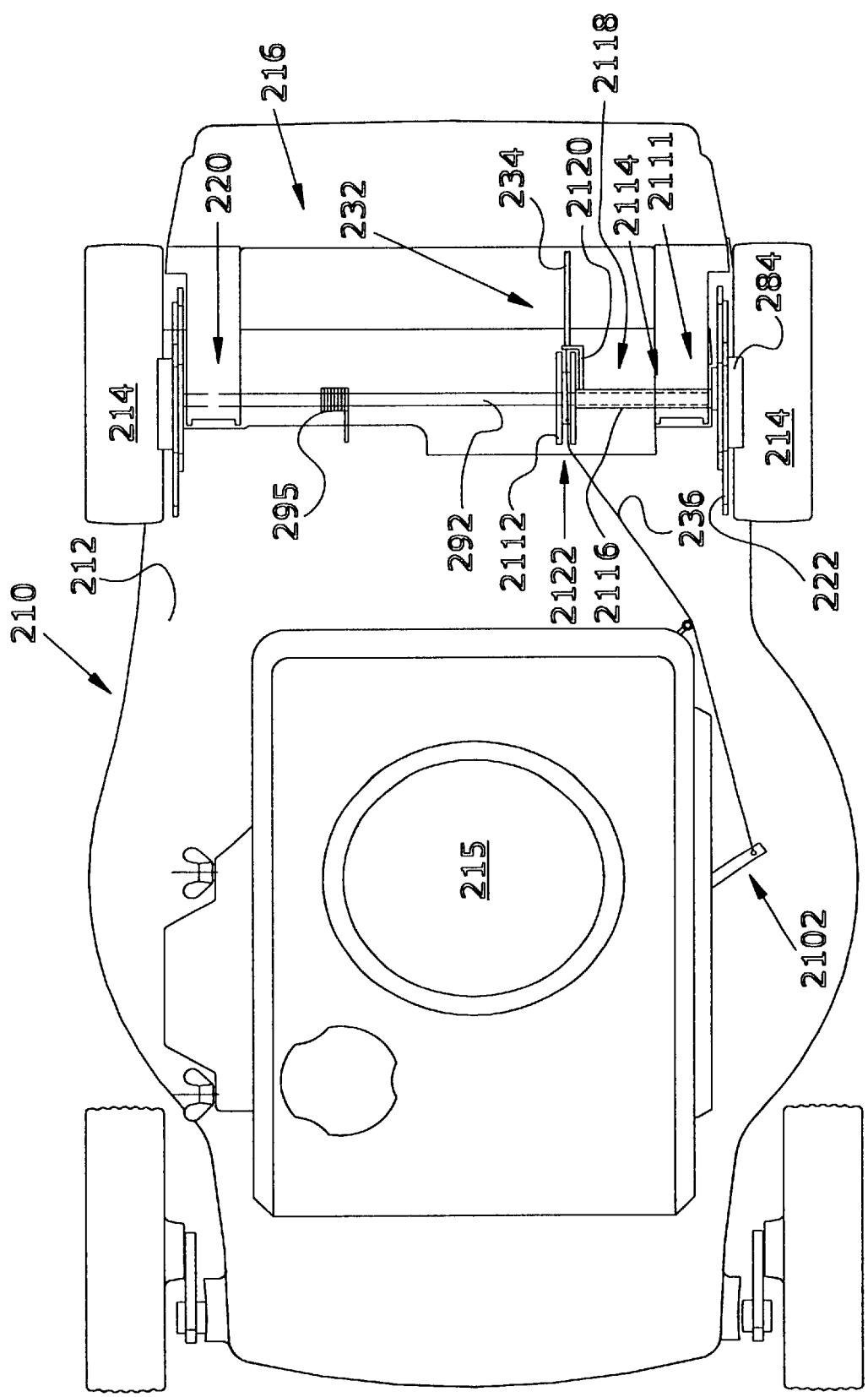
FIG. 10 is side view of the mower of the present invention having a locking mechanism including a stopping mechanism according to a second embodiment thereof.

Looking now to FIGS. 10–12, a second embodiment of the mower 10 is shown. With like numerals representing like parts as illustrated previously, all parts common and pertinent to the present embodiment are characterized by placement of a "2" in front thereof.

FIG. 10 shows a partial schematic diagram of the machine 210 viewed from above. On or in the rear part 216, two locking levers 222 are located, which substantially correspond to the locking lever 22 of the first design whereby only the left lever 222 is shown. The locking levers 222 are pivotally mounted on an axle 292 which is rotatably received by common mountings 2111. The axle 292 is loaded forwards or counterclockwise by means of a torsion spring 295. A disc 2112 constructed in the form of a belt pulley is firmly connected to the axle 292.

The locking lever 222 is closely connected to a bracket 2114 so that both can be turned in conjunction with the locking lever 222 on the axle 292. The bracket 2114 has a tube 2116 that runs inward on the axle 292 relative to the mower 210. The tube 2116 ends adjacent to the disc 2112 and has a supporting bracket at its end 2118. The axle 292 also works in conjunction with a locking mechanism 280, which has a right-hand as well as a left-hand stopping mechanism 284, whereby both stopping mechanisms 284 are arranged on the axle 292 adjacent to the outside of the locking levers 222. The stopping mechanisms 284 are firmly connected to the axle 292 so that they can be pivoted together with it. The stopping mechanisms 284 take the form of a substantially hooked disc, whereby their outer contours are defined by their function in accordance with FIGS. 11 and 12 and are discussed further below.

The operation of the locking lever 222 relative to the operation of the stopping mechanism 284 as well as the positioning of the handlebar 220 can be seen throughout FIGS. 10–12. Similar to the first embodiment, the actuator 228 works in conjunction with a pull cable 232. The casing 234 of the pull cable 232 is not movable or shiftable along a longitudinal axis thereof when connected with the supporting bracket 2120; however, it can, preferably, be turned or rotated with it. The core 236 of the pull cable 232, which runs across the supporting bracket 2120, is taken into a groove 2122 in the form of a channel in the disc 2112 and is conveyed further through a hole drilled in the disc 2112 that is not illustrated, and operates in accordance with the diagram in the first embodiment on an engine brake 2102. On the core 236 to one side of the drilled hole in the direction of the engine brake 2102, the core 236 becomes thicker so as to permit movement and positioning thereof towards the housing 212. However, thickening of the core 236 occurs in the area of the drilled hole so that a further pull on the core 236, caused by a rearward movement of the actuator 229, can result in a rearward movement of the disc 2112 against the force of the torsion spring 295. Accordingly, the handlebar 220 will be secured in its operating position.

FIG. 11 shows the handlebar swung forwards. Corresponding with FIG. 2 relative to the first embodiment, FIG. 11 shows the locking lever 222 swung forward. The supporting bracket 2120 is swung forwards so that it runs in the opposite direction to the position illustrated in FIG. 10. Also, the stopping mechanism 284 is swung forward since the axle 292 on which it is tightly arranged and with which it turns, is loaded toward the front by the torsion spring 295.

If, with the handlebar 220 swung forward, the actuator 228 is intentionally or accidentally activated or swung to the rear or towards the handlebar 220, then the core 236 is pulled backwards. There is, however, either no movement or only insignificant movement of the axle 292 and therefore no force on the engine brake 2102 is exerted by the core 236.

In FIG. 12, the handlebar 228 is shown swung backwards, whereby the locking lever 222 is also swung backwards. The stopping mechanism 284 is also swung backwards, which is a position it assumes when the actuator 228 is also swung backwards or is activated. By moving the actuator 228 with a handlebar 220 swung backwards, the core 236 is pushed back and thus moves the disc 2112 backward as well as the axle 295, and also the stopping mechanism 284. Since the locking lever 222 is also swung backwards, the supporting bracket 2120 is shown in its backwards-running position shown in FIG. 10.

If the actuator 228 is not activated when the handlebar 220 is swung backwards, then the axle 292 is swung forward along with the disc 2112 and the stopping mechanism 284. The core 236 of the pull cable 230 is not pulled back and the engine brake 2102 is not opened so as to render the engine inoperative. Since the stopping mechanism 284 is swung forwards, it does not attach to a stopping element 273 on the locking lever 222, and the handlebar 220 is not locked and it is possible to swing it forward.

If the actuator 228 is activated, the core 236 is pulled back and the axle 292 is turned backwards or clockwise because of the attachment of the core 236 to the disc 2112. Since the handlebar 220 is situated in its operating position so as to be tilted rearwardly, the stopping element 273 is situated in such a position that the stopping mechanism 284 can attach or fasten to it in a manner that further movement of the axle 292 backwards is prevented. By an additional backwards movement of the actuator 228, the core 236 is now pulled further back, whereby it is positioned relative to the also tightly fixed outer casing 234 thereby operating to lift the engine brake 2102 and make operation of the engine 215 possible.

The contour of the stopping mechanism 284 is designed to permit both an attachment to the stopping element 273 when the handlebar 220 is swung rearwardly in addition to pivoting of the stopping element 273 up to the stopping mechanism 284 during a forward movement of the handlebar 220 when the actuator 228 is not activated. In addition, the stopping mechanism 284 has a hook-shaped section 224 that can interlock with the stopping element 273 to lock the handlebar 220, whereby forwardly applied pressure on the handlebar 220 in its locked position produces a force that runs from the pivotal axis of the axle 292 so as to counteract forces inducing shearing effect on the stopping mechanism 284, permitting it to be manufactured cost-effectively, for example from a plastic material.

It is to be noted that in the illustrated design, the disc 2112 is arranged in a left-hand area of the machine 210 since the engine brake 2102 is also located there. In a different point of attachment of an engine brake, for example in a middle or right-hand area, the position of the disc 2112 can be similarly adapted so that favorable movement with it and an unobstructed arrangement and operation of the core 236 is permitted. It is also contemplated that the core 236 of the pull cable 2132 operate on a first disc and a further disc, preferably also placed on the axle 292, by an additional means of transferal, for example a cord that operates on the engine brake 2102 to compensate for the difference between the arrangement of the engine brake 2102 and the pull cable 230 as well as to meet other structural requirements.

As an additional advantage stemming from an ability to move the handlebar 20, 220, there is created the possibility of tilting the machine 10, 210 backwards when its M handlebar 20, 220 is swung forwards, for example for maintenance work whereby the machine is propped up relative to the ground surface by the handlebar 20, 220. For this purpose, the handlebar 20, 220 can be secured, in its tilted position, to the machine 10, 210 or the housing unit 12, 212 by a simple pin or bolt connection.

Thus, more convenient access to the underside of the machine 10, 210 is made possible so that cleaning and maintenance work on the underside of the mower working parts or blades can be accomplished. The center of gravity of the machine 10, 210 in this position is between the pivotal axis of the rear wheels 14, 214 and the point of contact of the handlebar 20, 220 with the ground so that the machine 10, 210 is in a stable, balanced position. This feature can also be arranged on a machine 10, 210 that does not have the actuator or the securing mechanism described above, but is generally equipped with a movable handlebar 20, 220 or preferably one that can be pivoted.

Accordingly, there is provided a locking mechanism including an actuator which cooperate to control operation of the mower and any implement(s) powered thereby depending on the position of the mower handlebar. Further, there is provided as part of the locking mechanism an ability to secure a vegetation collection receptacle which is compatible with the housing unit having the locking mechanism. Also, there is provided an ability to prop the housing unit of the mower to a rearwardly tilted position to enhance the ability to inspect for and conduct required maintenance given an ability to position the handlebar.

Having described the preferred embodiment, it will become apparent that various modifications can be made without departing from the scope of the invention as defined in the accompanying claims.

I claim:

1. A vegetation maintenance device comprising:
    a) a housing unit;
    b) an engine connected with the housing unit;
    c) a member powered by the engine, the member effecting maintenance of vegetation;
    d) a handlebar extending from the housing unit so as to allow an operator to grasp the device, the handlebar being adjustable to a plurality of positions including at least an operating position and a non-operating position, movement of the handlebar towards the rear of the housing unit defines an operating position in which the engine and the member powered thereby are operational and movement of the handlebar towards the front defines the non-operating position in which the engine and the member powered thereby are not operational;
    e) an actuator for controlling operation of the engine and the member powered thereby;
    f) a locking mechanism for retaining the handlebar in a predetermined position when the actuator permits operation of the engine and the member powered thereby; and
    g) wheels to engage the ground and a braking mechanism connected with the handlebar to contact the wheels to restrict movement thereof when the handlebar is in its non-operating position.

2. The device according to claim 1 wherein:
    the handlebar extends from bars which extend upwardly from the housing unit, the bars being swivel-mounted on the housing unit so as to allow an operator move the handlebar to and from its operating and non-operating positions, respectively.

3. The device according to claim 2 wherein:
    at least one of the bars contains an aperture extending along the longitudinal axis thereof.

4. The device according to claim 3 wherein:
the locking mechanism is connected with the at least one of the bars and includes a pin connected thereto, the pin protruding through the aperture to permit the locking mechanism to move with the handlebar as it is placed in either its operating or non-operating position.

5. The device according to claim 4 wherein:
the locking mechanism includes a substantially disc-shaped portion.

6. The device according to claim 5 wherein:
the disc-shaped portion includes at least one projection on a side thereof.

7. The device according to claim 6 wherein:
the locking mechanism further includes an axle connected with the housing portion and having attached thereto a collar portion, the collar portion being engageable with the at least one projection to assist in locking the handlebar in its operating position upon movement of the handlebar thereto.

8. The device according to claim 7 wherein:
the actuator includes a compressible trigger mounted with the handlebar.

9. The device according to claim 8 wherein:
the actuator further includes an extensible cable having first and second ends, the first end thereof being attached with the trigger and the second end thereof being connected with a spring-loaded engine brake to either allow or disallow operation of the engine and/or the member powered thereby upon movement of the actuator.

10. The device according to claim 9 wherein:
the cable is housed by a cover along a portion thereof, the cover having first and second ends through which the cable extends, the first end being connected with the handlebar and the second end being connected with the collar portion.

11. The device according to claim 10 wherein:
the collar portion is arranged alongside the disc and is positioned to share an axis passing through the disc and which is transverse to the longitudinal axis of the bar on which it is mounted.

12. The device according to claim 11 wherein:
the collar portion is pivotally attached to the cover so as to allow it to move throughout a range of motion traveled by the handlebar.

13. The device according to claim 12 wherein:
as the handlebar is moved into its non-operating position, the at least one projection on the disc move towards the rear of device and away from the collar portion.

14. The device according to claim 13 wherein:
when the handlebar is moved into its operating position, the at least one projection on the disc are positioned towards the front of the device and towards the collar portion whereby it is received by the collar portion.

15. The device according to claim 14 wherein:
the collar portion is loaded by a spring associated with the cover and which abuts against the collar portion, movement of the handlebar rearwardly of the housing unit to its operating position rotates the disc rearwardly so as to cause the collar portion to receive and embrace the at least one projection.

16. The device according to claim 15 wherein:
compression of the trigger towards the handlebar causes the pull cable to become stretched whereby the cable presses against the cover to cause the collar portion and the cover to move together, whereby the collar portion remains embraced with the first projection and abuts against a second projection adjacent the first projection so as to prevent further movement of the collar portion and thereby lock the handlebar into the operating position.

17. The device according to claim 15 wherein:
compression of the trigger in the operating position relieves the spring force of the engine brake so as to permit operation of the engine and the member powered thereby when the handlebar is locked in the operating position.

18. The device according to claim 17 wherein:
the spring force on the engine brake surpasses the force emitted by the spring acting on the collar portion resulting in the application of the engine brake with respect to the engine even in the presence of compression of the trigger towards the handlebar so as to draw up slack present in the pull cable.

19. The device according to claim 13 wherein:
the collar portion is loaded by a spring associated with the cover and which abuts against the collar portion, movement of the handlebar forwardly relative to the housing unit rotates the disc forwardly so as to move the projections associated with the disc away from the collar portion.

20. The device according to claim 2 further comprising:
an axle pivotally connected between the bars, the locking mechanism being connected with the axle so as to be moveable therewith as the handlebar is moved between the operating and non-operating positions.

21. The device according to claim 20 wherein:
the locking mechanism includes a substantially disc-shaped portion attached with the axle.

22. The device according to claim 21 wherein:
the disc-shaped portion includes at least one projection on a side thereof.

23. The device according to claim 22 wherein:
the locking mechanism further includes a stop member including a hook-shaped end engageable with the at least one projection to cause the handlebar to be locked in at least one of the operating and non-operating positions.

24. The device according to claim 23 wherein:
the actuator includes a compressible trigger mounted with the handlebar.

25. The device according to claim 24 wherein:
the actuator further includes an extensible cable having first and second ends, the first end thereof being attached with the trigger and the second end thereof being connected with a spring-loaded engine brake to either allow or disallow operation of the engine and/or the member powered thereby upon movement of the actuator.

26. The device according to claim 25 wherein:
a second disc-shaped portion is mounted with the axle, the cable being connected through the second disc portion so as to rotate the axle and the first disc portion upon movement of the actuator.

27. The device according to claim 26 wherein:
as the handlebar is moved into its non-operating position, the at least one projection of the first disk-shaped portion moves towards the rear of device and away from the book-shaped end of the stop member.

28. The device according to claim 27 wherein:

when the handlebar is moved into its operating position, the at least one projection is positioned towards the front of the device and towards the hook-shaped end whereby it is received by the hook-shaped end of the stop member.

29. The device according to claim 28 wherein:

the axle is loaded by a spring, movement of the handlebar rearwardly of the housing unit to its operating position rotates the disc rearwardly so as to cause the collar portion to receive and embrace the at least one projection to lock the handlebar in its operating position.

30. The device according to claim 29 wherein:

compression of the trigger in the operating position relieves the spring force of the engine brake so as to permit operation of the engine and the member powered thereby when the handlebar is locked in the operating position.

31. The device according to claim 30 wherein:

movement of the handlebar forwardly relative to the housing unit rotates the disc forwardly so as to move the projections associated with the first disc away from the hook-shaped end of the stop member.

32. The device according to claim 31 wherein:

the spring force on the engine brake surpasses the force emitted by the spring acting on the axle resulting in the application of the engine brake with respect to the engine even in the presence of compression of the trigger towards the handlebar so as to draw up slack present in the pull cable.

33. A vegetation maintenance device comprising:

a) a housing unit supported upon a plurality of ground engaging wheels, the housing unit including a propping unit attached at the rear thereof, the propping unit having projections therein, the projections creating a series of grooves therebetween and into which an attachment mechanism of a collecting receptacle can be mated;

b) an engine connected with the housing unit;

c) a member powered by the engine, the member effecting maintenance of vegetation;

d) a framework of bars extending upwardly from the housing unit to support a handlebar at their ends so as to allow an operator to grasp the device, the handlebar being pivotally connected to the housing unit and adjustable to a plurality of positions including at least an operating position and a non-operating position, the bars including a braking device on their respective ends, the braking device acting on at least one of the wheels to prevent movement of the device when the handlebar is tilted forwardly into its non-operating position;

e) an attachment mechanism mounted with the housing to permit an attachment to be connected thereto, the attachment including a debris collection receptacle; and f) a locking mechanism cooperating with the attachment mechanism for locking the handlebar in at least one of the operating and non-operating positions and being adapted to hold the attachment against the attachment mechanism, the locking mechanism including a hook-shaped portion to ensure interlocking thereof with the collection receptacle and a disc-shaped member that is pivotable throughout a range of motion traveled by the handlebar so as to be lockably engageable with the receptacle when the handlebar rests in its operating position, the locking mechanism and the handlebar having different pivotal axes.

* * * * *